United States Patent

[11] 3,522,782

[72] Inventor: Basil M. McNew
Fort Worth, Texas
[21] Application No.: 707,514
[22] Filed: Feb. 23, 1968
[45] Patented: Aug. 4, 1970
[73] Assignee: Tandy Corporation,
Fort Worth, Texas
a Corp. of Delaware

[54] METHOD FOR EDGE-BINDING LEATHER GOODS, AND THE LIKE
2 Claims, Drawing Fig.

[52] U.S. Cl. .................................................. 112/262,
112/426, 150/38
[51] Int. Cl. .................................................. D05b 1/00
[50] Field of Search ....................................... 112/262,
423, 426; 150/38, 28, 32; 36/11; 12/142; 2/274, 275

[56] References Cited
UNITED STATES PATENTS
2,294,635  9/1942  Sherwood ................. 150/38

OTHER REFERENCES
U.S. Dept. Commerce Pamphlet, "Make It of Leather," 1939, Trade Promotion Series No. 190, Bureau of Foreign and Domestic Comm.

Primary Examiner— Richard J. Scanlan, Jr
Attorney— Cecil L. Wood

ABSTRACT: A method for binding the finished edges of laminated sheets of leather, and the like, such as in the fabrication of wallets, purses, traveling bags and travel kits, and other similar articles, as by folding the peripheral edges of an outer laminae over the adjacent edges of one or more inner laminae, and forming a plurality of spaced rows of perforations along and adjacent to the peripheral edges of the outer laminae, and a single row of perforations adjacent to and along the edges of the inner laminae whereby, when the peripheral edges of the outer laminae are folded over the adjacent edges of the inner laminae, the rows of perforations in each lamination will register, and securing the laminated sheets by a lace spirally threaded through the perforations, and spaced inwardly from the perimetrical edges of the outer laminae.

Patented Aug. 4, 1970 3,522,782

INVENTOR
Basil M. McNew

BY
ATTORNEY

U.S. PATENT 3,522,782
METHOD FOR EDGE-BINDING LEATHER GOODS, AND THE LIKE

SUMMARY

This invention relates to a method for binding the edges of laminated sheets of leather, or other materials, in the manufacture of such articles as wallets, purses, travel bags and kits, and other similar articles.

An object of the invention resides in the provision of a method by which articles, generally classed as leather goods, and formed of laminated sheets of leather, can be produced by joining the edges of the sheets by a lace without overreaching or embracing the margins thereof in the conventional manner of finishing such articles.

Another object of the invention is that of providing a method by which articles composed of laminated sheets of leather, or imitation leather, can be fabricated in a manner which is conducive to refinement in appearance, avoiding the usual rugged type of bindings wherein the lacing materials are looped over the finished edges of the joined sheet materials of which the articles are formed.

Broadly, the invention contemplates the provision of a method of fabricating such articles as wallets, purses, and the like, by lacing the components together in such manner as to confine the loops of the lacing materials within the margins of the joined parts.

DESCRIPTION OF THE DRAWING

While the foregoing objects are paramount, other and lesser objects will become apparent as the description proceeds when considered with the appended drawings wherein.

DETAILED DESCRIPTION

It is common practice in leathercrafting or the manufacture of fancy leather goods, to bind the edges of such articles by lacing wherein the lace materials are brought over and around the joined edges of the articles rather than confining the lacing entirely within the marginal edges. Such procedure results in an unnecessary bulkiness about the margins as well as a tendency to produce a rough and rugged appearance.

Figure 2:
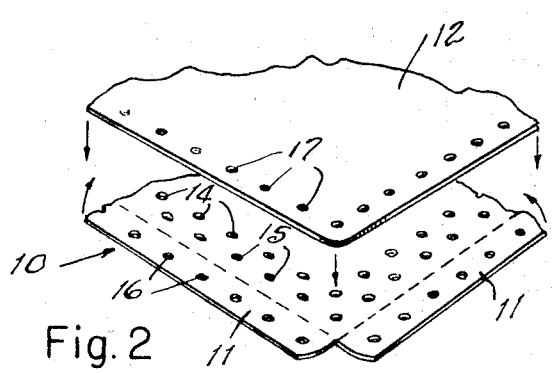
FIGURE 2 is an exploded view fragmentarily showing inner and outer laminations of leather sheets, and showing the marginal tabs and series of perforations on the outer sheet.
Figure 3:
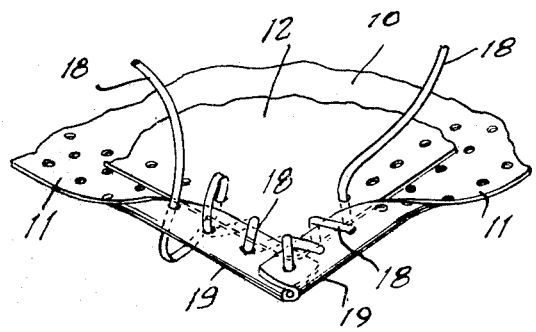
FIGURE 3 is a perspective view fragmentarily showing a partially completed corner portion of an article, such as a wallet, showing the lacing operation.
Figure 4:
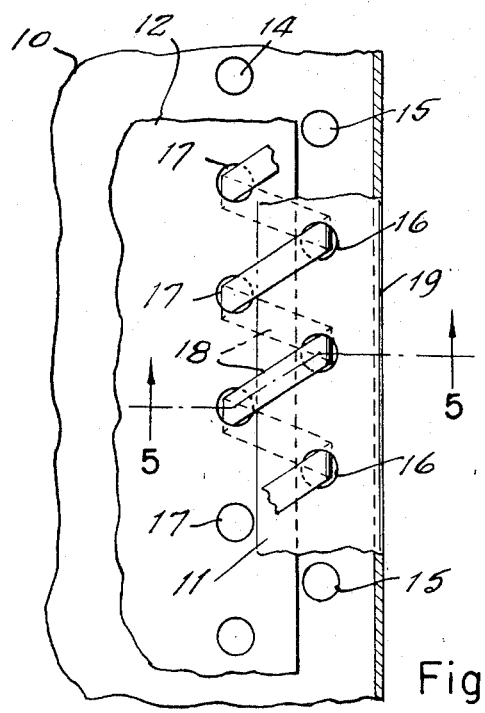
FIGURE 4 is a fragmentary enlarged plan view showing the association of the inner and outer sheets and the arrangement of the lacing.
Figure 5:
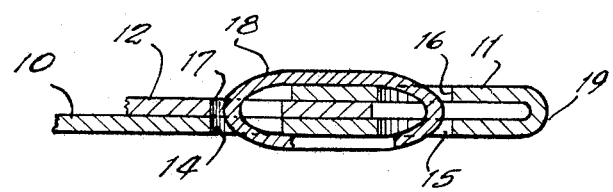
FIGURE 5 is a fragmentary sectional view, on line 5-5 of FIGURE 4 showing the lacing arranged through both inner and outer sheets, the marginal tabs of the outer sheet being folded over the edges of the inner sheet.

In carrying out the method of the invention, the sheets of leather of which the article is formed are cut to proper dimensions, the cover, or sheet 10, being shaped to provide marginal extensions 11, as shown in FIGURE 2, foldable over the marginal edges of one or more inner sheets 12, in the manner shown in FIGURES 3, 4 and 5.

Figure 1:
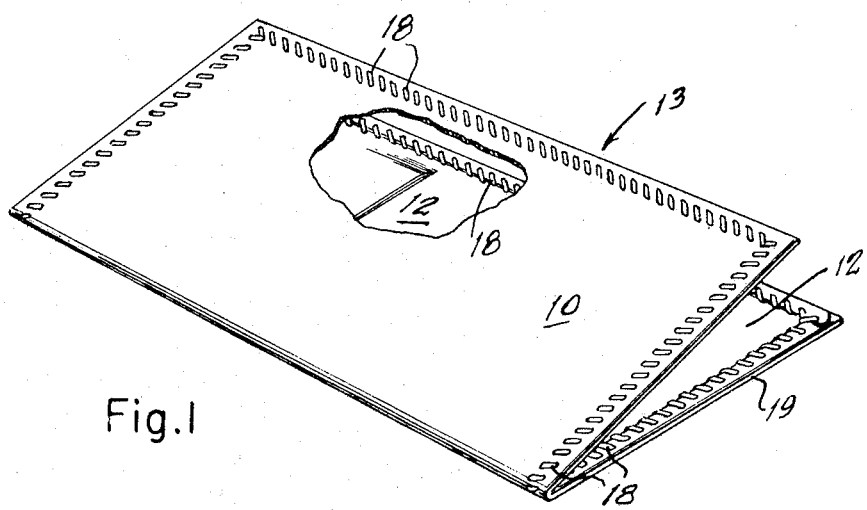
FIGURE 1 is a perspective view of a wallet made in accordance with the invention, a portion being broken away to show the internal lacing.

The drawings more specifically illustrate the steps in producing a wallet 13, such as shown in FIGURE 1, but other similar articles can be fabricated in a like manner. FIGURE 2 is an exploded view fragmentarily showing, in perspective, a plurality of sheets of leather, or other suitable materials, for superimposition or lamination, the cover sheet 10 being of greater dimensions than the inner sheet 12, and having three rows of perforations 14, 15 and 16 spaced about and adjacent to its marginal edges, the outer row or series 16 being formed along the marginal extensions 11. The inner sheet 12 has a series of spaced perforations 17 along and adjacent its margin and these correspond to and register with the innermost series of perforations 14 in the cover sheet 10 when the sheets are laminated as in FIGURES 3, 4 and 5.

In practice, therefore, the inner sheet or sheets 12 are superimposed upon the cover sheet 10, as indicated by the arrows in FIGURE 2, and the marginal extensions 11 of the cover sheet 10 are folded over the edges of the inner sheet 12, along the dotted lines, and in the manner shown by the arcuate arrows in FIGURE 2, the outer series of perforations 16 becoming aligned with the intermediate series 15, as best illustrated in FIGURES 3, 4 and 5.

Upon assembling the sheets 10 and 12 in the manner described a lace 18, which may be formed of leather, or other suitable materials, is threaded through the several series of perforations 14, 15 and 16, as illustrated in FIGURES 3, 4 and 5, and drawn taut and pressed flat so as to produce the result shown in FIGURES 1, 4 and 5, the lacing being retained well within the marginal rolled edges 19 of the finished article so that such edges are smooth and present a pleasing appearance. It is apparent also that the lacing 18 is not subject to the wear that could be imposed thereon as when the turns thereof are brought over the edges 19 in the conventional manner.

The method herein described may be modified with respect to certain features of its application and manner in which it is performed without departing from the spirit of the invention or the scope of the appended claims.

I claim:

1. A method for edge-binding laminated sheets of leather and other materials in the fabrication of wallets and similar articles, having a cover sheet and at least one inner sheet, said sheets having lines of equi-distantly spaced perforations, the cover sheet having a body portion with marginal extensions and a first of said lines of said perforations formed medially of said extensions, second and third of said lines of said perforations in said body portion being spaced and parallel to said first line in said extensions, said third line perforations being staggered in relation to said first and second line perforations, and a fourth of said lines of said perforations formed in said inner sheet parallel to and spaced from the marginal edge thereof a distance equal to the distance from said second line to said third line in said cover sheet, the steps comprising: folding the marginal extensions of the cover sheet over the marginal edges of the inner sheet, aligning the first and second lines of perforations in the cover sheet, aligning the third line of perforations in the cover sheet with the line of perforations in the inner sheet, spirally threading a lace through the first perforation in the first and second lines in the cover sheet then through the first perforation in the line in the inner sheet and through the first perforation in the third line in the cover sheet, repeating the sequence of steps through all perforations and then tightening and securing the lace.

2. A method for edge-binding laminated sheets of leather and other materials in the fabrication of wallets and similar articles, having a cover sheet and at least one inner sheet, said sheets having lines of equi-distantly spaced perforations, the cover sheet having a body portion with marginal extensions and a first of said lines of said perforations formed medially of said extensions, second and third of said lines of said perforations in said body portion being spaced and parallel to said first line in said extensions, said third line perforations being staggered in relation to said first and second line perforations, and a fourth of said lines of said perforations formed in said inner sheet parallel to and spaced from the marginal edge thereof a distance equal to the distance from said second line to said third line in said cover sheet, the steps comprising: folding the marginal extensions of the cover sheet over the marginal edges of the inner sheet, aligning the first and second lines of perforations in the cover sheet, aligning the third line of perforations in the cover sheet with the line of perforations in the inner sheet, spirally threading a lace through the first perforation in the first and second lines in the cover sheet, then through the first perforation in the third line in the cover sheet and then through the first perforation in the line in the inner sheet, repeating the sequence of steps through all perforations and then tightening and securing the lace.